(12) United States Patent
Rudrapatna et al.

(10) Patent No.: US 9,062,884 B2
(45) Date of Patent: Jun. 23, 2015

(54) COMBUSTORS WITH QUENCH INSERTS

(75) Inventors: Nagaraja S. Rudrapatna, Chandler, AZ (US); Lowell Frye, Chandler, AZ (US); William Landram, Glendale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1029 days.

(21) Appl. No.: 13/116,897

(22) Filed: May 26, 2011

(65) Prior Publication Data

US 2012/0297778 A1 Nov. 29, 2012

(51) Int. Cl.
*F23R 3/04* (2006.01)
*F23R 3/06* (2006.01)

(52) U.S. Cl.
CPC ............ *F23R 3/045* (2013.01); *Y10T 29/49348* (2015.01); *F23R 3/06* (2013.01); *Y02T 50/675* (2013.01)

(58) Field of Classification Search
CPC ............ F23R 3/045; F23R 3/06; F23R 3/002; F23R 3/04; Y02T 50/675
USPC .................................... 60/752–760, 796, 798
See application file for complete search history.

(56) References Cited

U.S. PATENT DOCUMENTS

| | | | |
|---|---|---|---|
| 3,545,202 A * | 12/1970 | Batt et al. ......................... | 60/757 |
| 4,132,066 A | 1/1979 | Austin, Jr. et al. | |
| 4,302,941 A | 12/1981 | DuBell | |
| 4,315,405 A * | 2/1982 | Pidcock et al. .................. | 60/752 |
| 4,622,821 A | 11/1986 | Madden | |
| 4,628,694 A | 12/1986 | Kelm et al. | |
| 4,653,279 A | 3/1987 | Reynolds | |
| 4,700,544 A | 10/1987 | Fucci | |
| 4,787,208 A * | 11/1988 | DeCorso ......................... | 60/723 |
| 4,875,339 A | 10/1989 | Rasmussen et al. | |
| 4,887,432 A | 12/1989 | Mumford et al. | |
| 5,235,805 A * | 8/1993 | Barbier et al. ............... | 60/39.23 |
| 5,687,572 A | 11/1997 | Schrantz et al. | |
| 6,170,266 B1 | 1/2001 | Pidcock et al. | |
| 6,266,961 B1 | 7/2001 | Howell et al. | |
| 6,351,949 B1 * | 3/2002 | Rice et al. ....................... | 60/752 |
| 6,532,929 B2 | 3/2003 | Antonevich et al. | |
| 6,668,559 B2 * | 12/2003 | Calvez et al. ................... | 60/796 |
| 6,711,900 B1 | 3/2004 | Patel et al. | |
| 7,000,397 B2 | 2/2006 | Pidcock et al. | |
| 7,059,133 B2 | 6/2006 | Gerendas | |
| 7,506,512 B2 | 3/2009 | Schumacher et al. | |

(Continued)

OTHER PUBLICATIONS

Rudrapatna, N. S. et al.; Combustors With Quench Inserts, filed Jul. 26, 2010 and assigned U.S. Appl. No. 12/843,750.

*Primary Examiner* — Phutthiwat Wongwian
*Assistant Examiner* — Steven Sutherland
(74) *Attorney, Agent, or Firm* — Ingrassia Fisher & Lorenz, P.C.

(57) ABSTRACT

A combustor is provided for a turbine engine. The combustor includes a first liner having a first hot side and a first cold side; a second liner having a second hot side and a second cold side, the second hot side and the first hot side forming a combustion chamber therebetween. The combustion chamber is configured to receive an air-fuel mixture for combustion therein. The combustor further includes an insert having a body portion extending through the first liner and terminating at a tip, the body portion configured to direct air flow into the combustion chamber. The insert further includes a cooling hole defined in the body portion and configured to direct a first portion of the air flow toward the tip as cooling air.

7 Claims, 10 Drawing Sheets

(56) References Cited

U.S. PATENT DOCUMENTS

| | | |
|---|---|---|
| 7,631,502 B2 | 12/2009 | Burd et al. |
| 7,726,131 B2 | 6/2010 | Sze et al. |
| 7,748,222 B2 | 7/2010 | Bernier et al. |
| 8,281,600 B2 * | 10/2012 | Chen et al. ............... 60/772 |
| 2002/0189260 A1 | 12/2002 | David et al. |
| 2003/0046934 A1 | 3/2003 | Sherwood |
| 2004/0045298 A1 | 3/2004 | Pidcock et al. |
| 2008/0156943 A1 | 7/2008 | Sreekanth et al. |
| 2009/0120095 A1 | 5/2009 | Berry et al. |
| 2010/0122537 A1 * | 5/2010 | Yankowich et al. ............ 60/754 |

* cited by examiner

COMBUSTORS WITH QUENCH INSERTS

TECHNICAL FIELD

The following discussion generally relates to gas turbine engine combustors, and more particularly, to combustors with quench inserts and methods for installing the same.

BACKGROUND

Gas turbine engines, such as those used to power modern commercial aircraft, typically include a compressor for pressurizing a supply of air, a combustor for burning fuel in the presence of the pressurized air, and a turbine for extracting energy from the resultant combustion gases. The combustor typically includes radially spaced apart inner and outer liners. The inner and outer liners generally define an annular combustion chamber between the compressor and the turbine. A number of circumferentially distributed fuel injectors typically project into the forward end of the combustion chamber to supply the fuel to the combustion chamber, and one or more rows of circumferentially distributed air admission holes in the liners admit air into the combustion chamber for combustion.

Modern combustors generally attempt to operate at very high temperatures, to achieve high operability, and to produce relatively low gaseous pollutant emissions during combustion, particularly oxides of nitrogen (NOx). One type of combustor that may provide one or more of these advantages is a rich burn, quick quench, lean burn (RQL) combustor, which includes the following three serially-arranged combustion zones: a rich burn zone at the forward end of the combustor, a quench or dilution zone downstream of the rich burn zone, and a lean burn zone downstream of the quench zone. By precisely controlling the stoichiometries between the air and fuel in each zone, high-temperature excursions can be reduced and the resulting NOx emissions can be minimized. The design and development of the quench zone geometry is commonly one of the primary challenges in the successful implementation of low-emissions RQL combustors. However, at times, designs that provide desired quench zone characteristics may adversely impact cooling schemes for the combustor components.

Accordingly, it is desirable to provide RQL combustors with a geometry that promotes low NOx emissions and increased operability while maintaining adequate cooling for the combustor components. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor is provided for a turbine engine. The combustor includes a first liner having a first hot side and a first cold side; a second liner having a second hot side and a second cold side, the second hot side and the first hot side forming a combustion chamber therebetween. The combustion chamber is configured to receive an air-fuel mixture for combustion therein. The combustor further includes an insert having a body portion extending through the first liner and terminating at a tip, the body portion configured to direct air flow into the combustion chamber. The insert further includes a cooling hole defined in the body portion and configured to direct a first portion of the air flow toward the tip as cooling air.

In accordance with another exemplary embodiment, a method is provided for installing an insert in an air admission hole of a combustor liner. The insert includes an inlet portion, a body portion extending from the inlet portion with a tip on an end opposite the inlet portion, and a shoulder circumscribing the body portion. The combustor liner has a hot side and a cold side. The method includes inserting the inlet portion through the air admission hole from the hot side to the cold side until the shoulder abuts the hot side; deforming the inlet portion such that the inlet portion has an outer diameter greater than a diameter of the air admission hole; and drilling a cooling hole through the body portion from an interior surface to an exterior surface.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Exemplary embodiments described herein provide a combustor having single- or double-walled liners with an insert to guide pressurized air through the liner and into the combustion chamber. During installation, each insert generally includes a tubular body portion that is inserted from the hot side through the liner until a shoulder circumscribing the body portion abuts the hot side. A tool then deforms an inlet portion projecting through the cold side to form a flared inlet portion. The flared inlet portion and shoulder capture the liner to retain the insert relative to the liner without welding or other bonding techniques. Cooling holes are then laser drilled into the body of the insert to provide cooling air flow to the tip of the insert during operation.

Figure 1:
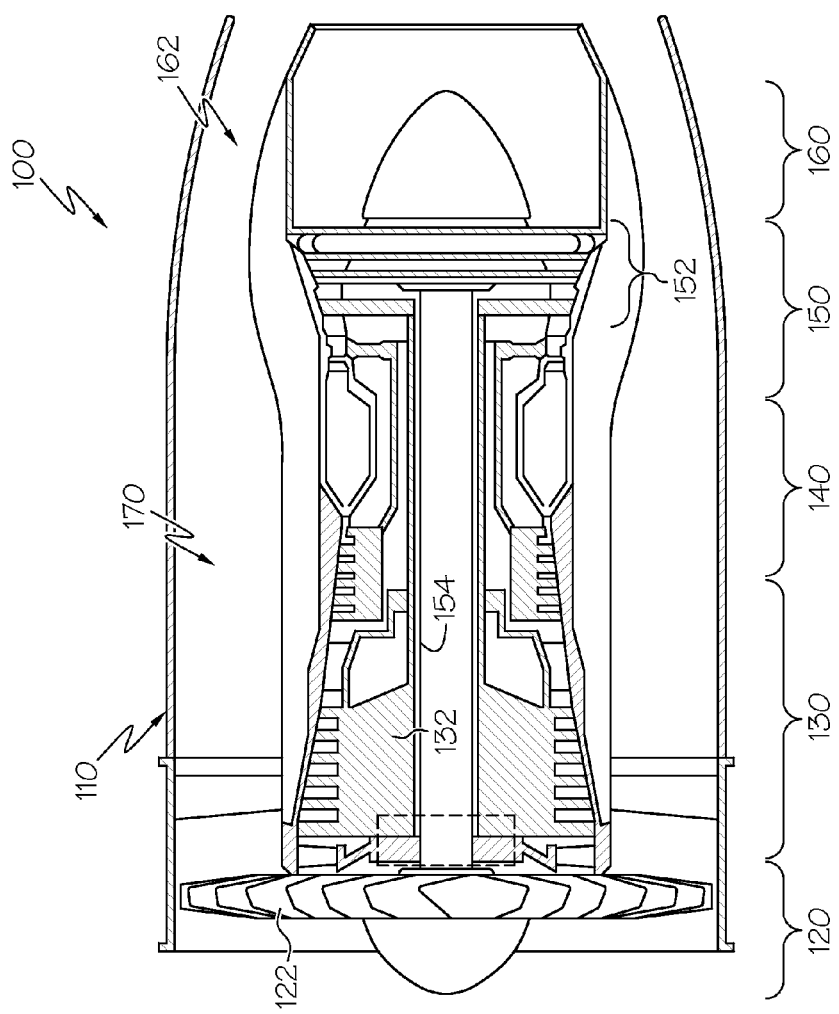
FIG. 1 is a cross-sectional view of a gas turbine engine according to an exemplary embodiment.

FIG. 1 is a simplified, cross-sectional view of a gas turbine engine 100 according to an exemplary embodiment. The engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132 that raise the pressure of the air directed from the fan 122. The compressors 132 then direct the compressed air into the combustion section 140. In the combustion section 140, the high pressure air is mixed with fuel and combusted. The combusted air is then directed into the turbine section 150.

The turbine section 150 may include a series of turbines 152, which may be disposed in axial flow series. The combusted air from the combustion section 140 expands through and rotates the turbines 152 prior to being exhausted through a propulsion nozzle 162 disposed in the exhaust section 160. In one embodiment, the turbines 152 rotate to drive equipment in the engine 100 via concentrically disposed shafts or spools. Specifically, the turbines 152 may drive the compressor 132 via one or more rotors 154.

Figure 2:
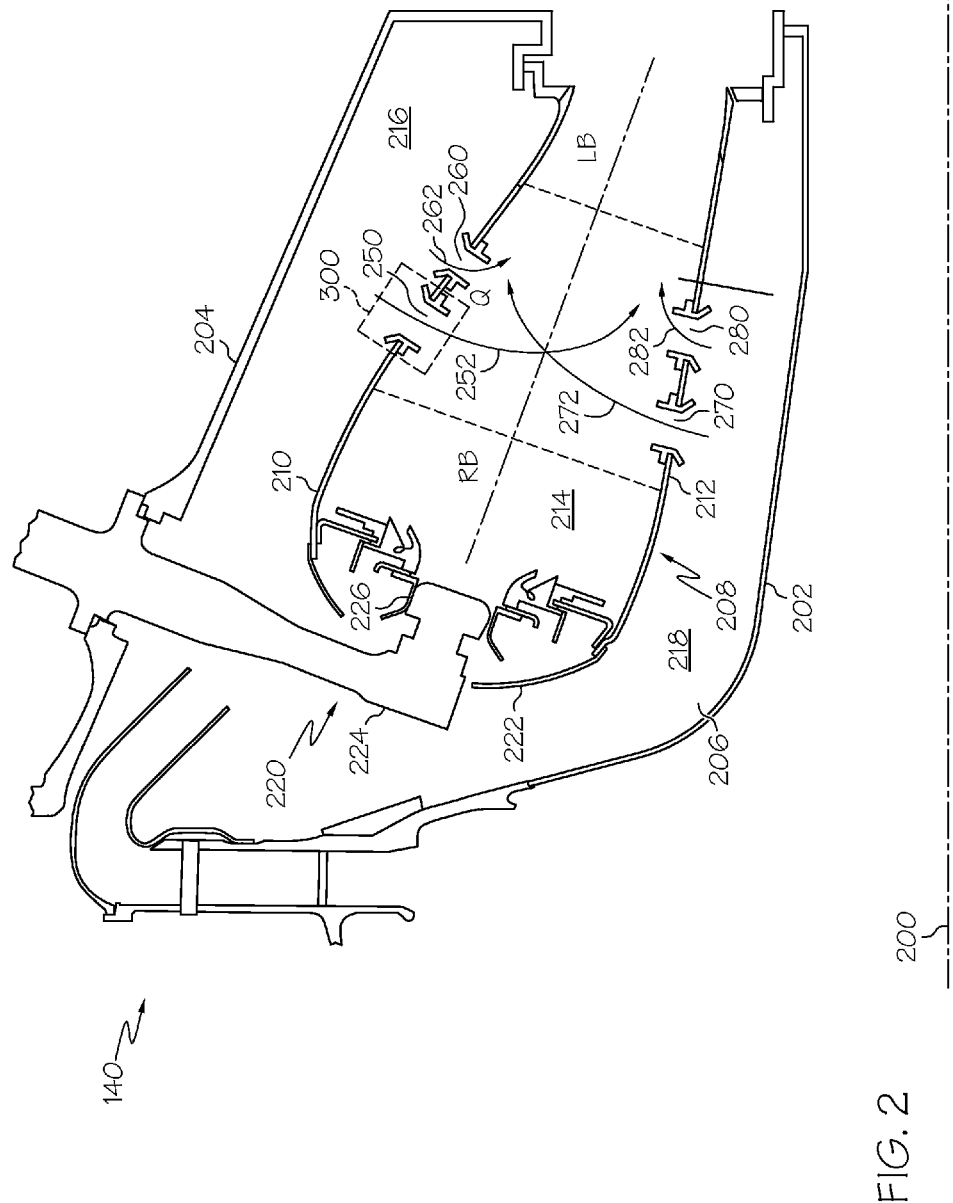
FIG. 2 is a partial, cross-sectional side elevation view of the combustor section of FIG. 1 in accordance with an exemplary embodiment.

FIG. 2 is a more detailed cross-sectional view of the combustion section 140 of FIG. 1. In FIG. 2, only half the cross-sectional view is shown; the other half would be substantially rotationally symmetric about a centerline and axis of rotation 200. The combustion section 140 of FIG. 2 is an annular combustion section 140, although aspects of exemplary embodiments described herein may also be useful in can combustors, can-annular combustors, and other types of combustors. Moreover, exemplary embodiments may find beneficial uses in many industries, including aerospace and particularly in high performance aircraft, as well as automotive and electrical generation.

The combustion section 140 includes a radially inner case 202 and a radially outer case 204 concentrically arranged with respect to the inner case 202. The inner and outer cases 202 and 204 circumscribe the axially extending engine centerline 200 to define an annular pressure vessel 206. The combustion section 140 also includes a combustor 208 residing within the annular pressure vessel 206. The combustor 208 is defined by an outer liner 210 and an inner liner 212 that is circumscribed by the outer liner 210 to define an annular combustion chamber 214. The liners 210 and 212 cooperate with cases 204 and 202 to define respective outer and inner air plenums 216 and 218.

The combustor 208 includes a front end assembly 220 comprising a dome assembly 222, fuel injectors 224, and fuel injector guides 226. One fuel injector 224 and one fuel injector guide 226 are shown in the partial cross-sectional view of FIG. 2. In one embodiment, the combustor 208 includes a total of sixteen circumferentially distributed fuel injectors 224, but it will be appreciated that the combustor 208 could be implemented with more or less than this number of fuel injectors 224. Each fuel injector 224 introduces a swirling, intimately blended fuel-air mixture that supports combustion in the combustion chamber 214.

The depicted combustor 208 is a rich burn, quick quench, lean burn (RQL) combustor. During operation, a portion of the pressurized air enters a rich burn zone RB of the combustion chamber 214 by way of passages in the front end assembly 220. This air is referred to as primary combustion air because it intermixes with a stoichiometrically excessive quantity of fuel introduced through the fuel injectors 224 to support initial combustion in the rich burn zone RB. The rich stoichiometry of the fuel-air mixture in the rich burn zone RB produces a relatively cool, oxygen-deprived flame, thus preventing excessive NOx formation and guarding against blow-out of the combustion flame during any abrupt reduction in engine power.

The combustion products from the rich burn zone RB, which include unburned fuel, then enter a quench zone Q. Jets 252 and 262 flow from the plenum 216 into the quench zone Q through air admission holes 250 and 260, respectively, in the outer liner 210. Similarly, jets 272 and 282 flow from the plenum 218 into the quench zone Q through air admission holes 270 and 280, respectively, in the inner liner 212. Additional holes with similar features and arrangements may be provided in both the outer and inner liners 210 and 212 to provide additional quench jets to the combustion chamber 214. The air admission holes 250, 260, 270, and 280 in the outer and inner liners 210 and 212 are discussed in further detail below.

The jets 252, 262, 272, and 282 are referred to as quench air because they rapidly mix the combustion products from their stoichiometrically rich state at the forward edge of the quench zone Q to a stoichiometrically lean state at, or just downstream of, the aft edge of the quench zone Q. The quench air rapidly mixes with the combustion products entering the quench zone Q to support further combustion and release additional energy from the fuel. Since thermal NOx formation is a strong time-at-temperature phenomenon, it is important that the fuel-rich mixture passing through the quench zone be mixed rapidly and thoroughly to a fuel-lean state in order to avoid excessive NOx generation. Thus the design of the quench air jet arrangement in an RQL combustor is important to the successful reduction of NOx levels.

Finally, the combustion products from the quench zone Q enter a lean burn zone LB where the combustion process concludes. As the combustion products flow into the lean burn zone LB, the air jets 252, 262, 272, and 282 are swept downstream and also continue to penetrate radially and spread out laterally and intermix thoroughly with the combustion gases.

Figure 3:
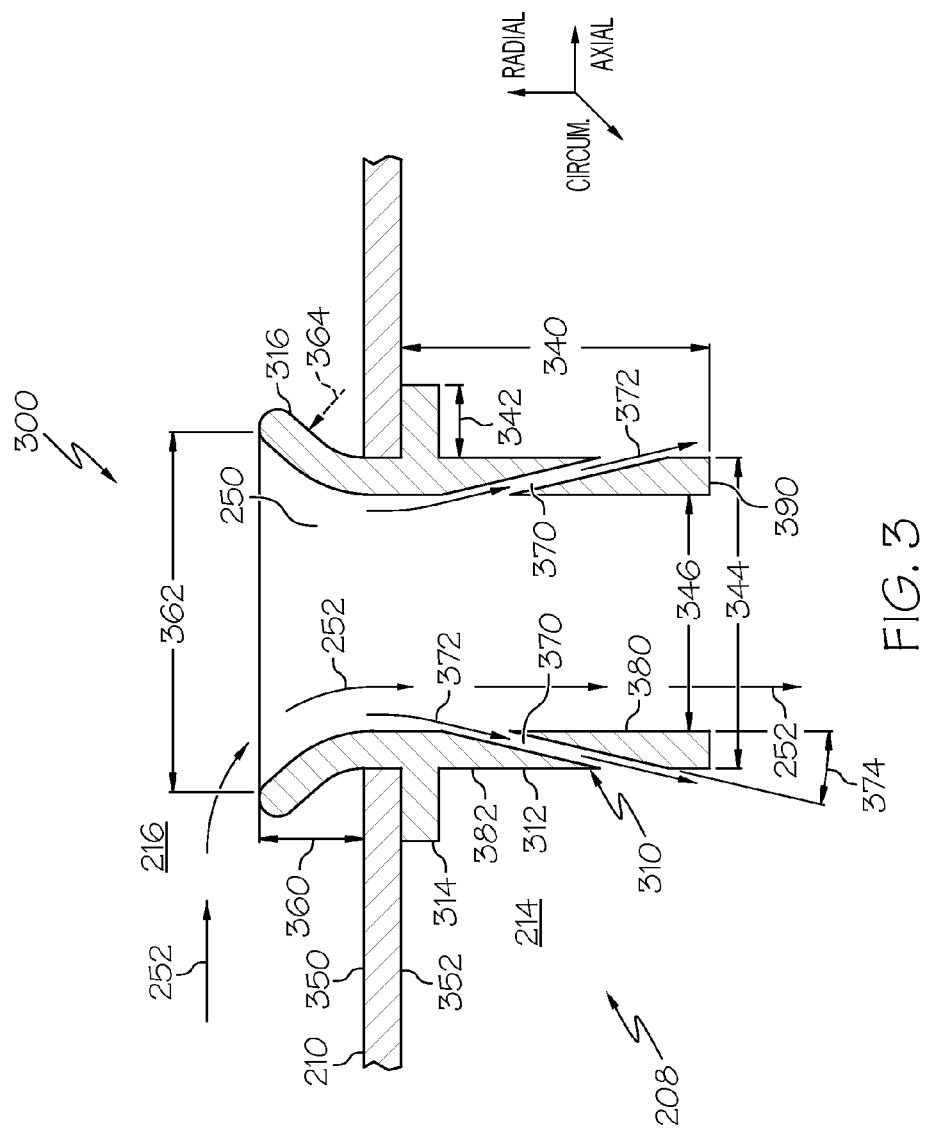
FIG. 3 is an enlarged portion of an insert in the combustor of FIG. 2 in accordance with an exemplary embodiment.

FIG. 3 is a cross-sectional view of an exemplary air admission hole 250 suitable for use in a combustor, e.g., the combustor 208 of FIG. 2. The position of air admission hole 250 generally corresponds to portion 300 of FIG. 2. As such, FIG. 3 depicts the air admission hole 250 extending through the outer liner 210 between the plenum 216 and the combustion chamber 214. However, the structure and function of the air admission hole 250 described below could also represent any of the air admission holes of the combustor 208, including air admission holes 260, 270, and 280 (FIG. 2).

In the exemplary embodiment depicted in FIG. 3, an insert 310 is arranged in the air admission hole 250 to guide the jets 252 from the plenum 216, through the air admission hole 250, and into the combustion chamber 214. Particularly, the plunged characteristics of the insert 310 assist the jets 252 in penetrating to the desired depth within the combustion chamber 214 for advantageous quench characteristics. Moreover, in one exemplary embodiment, the outer and inner liners 210 and 212 (FIGS. 2 and 3) have effusion holes (not shown) that provide a cooling layer of air on the combustor side of the combustion chamber 214. In some exemplary embodiments, the insert 310 decreases or eliminates any interference between the jet 252 and the effusion cooling layer.

As shown, the outer liner 210 is a single-walled liner with a cold side 350 that faces the plenum 216 and a hot side 352 that faces the combustion chamber 214. In the embodiment shown in FIG. 3, the insert 310 is formed from a single, discrete piece relative to the outer liner 210. The insert 310 includes a body portion 312 that extends through the outer liner 210 and into the combustion chamber 214. The body portion 312 is generally tubular and assists in guiding the jet 252 into the combustion chamber 214. The body portion 312 may have an interior surface 380 that defines an interior passage for the jet 252 and an exterior surface 382 that faces the outer liner 210 and the combustion chamber 214. The body portion 312 terminates at a tip 390.

A shoulder 314 circumscribes the body portion 312 and abuts the hot side 352 of the outer liner 210. The shoulder 314 generally extends in an axial direction to prevent the insert 310 from sliding out of the outer liner 210 in a radial direction towards the plenum 216. In one exemplary embodiment, the shoulder 314 may be contoured in the axial-circumferential plane to locally match any contour of the hot side 352. An inlet portion 316 extends in a radial direction from the body portion 312 and is flared or bell-shaped to guide the jet 252 into the insert 310. The flared geometry of the inlet portion 316 serves to secure the insert 310 in the radial direction towards the combustion chamber 214 by abutting the cold side 350 of the outer liner 210. In effect, the inlet portion 316 and shoulder 314 function to capture the outer liner 210 to retain the insert 310, particularly in the radial direction, i.e., the inlet portion 316 and shoulder 314 prevent the insert 310 from sliding out of the air admission hole 250 into the outer plenum 216 or into the combustion chamber 214.

Given this configuration, the insert 310 generally does not require additional securement to the outer liner 210 in the form of bonding, welding and/or additional components. As such, the insert 310 may be strain isolated with respect to both the cold side 350 and the hot side 352 in each of the radial, axial and circumferential directions to accommodate thermal growth differences.

As particularly shown in FIG. 3, the insert 310 may include one or more cooling holes 370 for delivering a portion 372 of the jet 252 to the tip 390 of the insert 310 as cooling air. As depicted in FIG. 3, the cooling holes 370 may extend from the interior surface 380 to the exterior surface 382 in the integral insert 310. As such, the portion 372 of the jet 252 flow from the interior surface 380 of the insert body portion 312 to the exterior surface 382 of the insert body portion 312 to deliver cooling air to the tip 390, particularly the exterior surface 382 of the tip 390. In general, the cooling holes 370 may be defined by an inlet on the interior surface 380 of the body portion 312 and an outlet on the exterior surface 382, particularly at or adjacent to the tip 390.

The cooling holes 370 may be any suitable angle 374 in the radial-axial plane, as shown in FIG. 3, and any suitable angle (not shown) in a circumferential direction, although more shallow angles 374 and thus, longer cooling holes 370, may provide increased heat transfer from the body portion 312 of the insert 310 as the cooling air 372 flows therethrough. In one exemplary embodiment, the angle 374 of the cooling holes 370 may be, for example, about 20°. The radius or cross-sectional area of the cooling holes 370 may be any suitable dimensions with considerations for cooling requirements, combustion considerations, flow rates, and velocities.

As described above, the cooling holes 370 function to remove heat from the insert 310 via convective heat transfer. Additionally, the cooling air 374 flowing from the cooling holes 370 may at least partially buffer the tip 390 from the hot combustion gases of the combustion chamber 308 without unduly interfering with effusion cooling of the liner 210, the combustion process, or the quench jets 252. As described below, the cooling holes 370 may be selectively provided as needed for cooling the body portion 312, particularly the tip 390.

The dimensions of the insert 310 may vary as necessary or desired. For example, the body portion 312 may extend into the combustion chamber 214 to any suitable depth 340 with considerations for desired jet penetration and effusion cooling impact. The body portion 312 generally has an outer diameter 344 that approximates the diameter of the air admission hole 250 in the liner 210 for a secure fit and leakage minimization. The inner diameter 346 of the body portion 312 may depend on aerodynamic and other operational and installation characteristics. For example, the inner diameter 346 may depend on the desired quantity of air passing through the air admission hole 250 and the amount of cooling air 372 needed at the tip 390. The shoulder 314 may extend to a length 342 that is greater than the diameter 344 of the air admission hole 250 without unduly interfering with operational and/or cooling performance. The inlet portion 316 may have a height 360, diameter 362, and curvature 364 for optimally guiding the jet 252 into the insert 310. Generally, the curvature 364 is elliptical, i.e., with a changing radius of curvature. In other embodiments, the curvature 364 may have a constant radius of curvature or have straight sections. In general, based on the configuration of the insert 310, the temperature profile of the combustion gases can be adjusted without compromising fuel-air mixing, which could lead to elevated levels of NOx. Additionally, based on the particular configuration of the cooling holes 370, the temperature profile of individual inserts 310 may be adjusted, as described in greater detail below.

Some exemplary dimensions or design considerations will now be provided. As one example, the amount of air flow forming the jet 252 may be based on the overall aerodynamic design of the combustor. The outer diameter 344 of the body portion 312 may be, for example, about 0.06-0.1 inches larger than the inner diameter 346 and the inner diameter 346 may be, for example, 0.1-0.4 inches, although any suitable sizes may be provided. As noted above, the depth 340 may extend from the hot side 352 beyond the effusion cooling layer, such as, for example, about 0.075-0.15 inches. The length 342 of shoulder 314 may extend to any extent that prevents the insert from sliding through the air admission hole 250, such as for example, about 0.02-0.03 inches. The inlet height 360, inlet diameter 362, and curvature 364 may generally be related to one another by CFD modeling. For example, each relative diameter 362 through the inlet 316 may be associated with a height 360 based on a polynomial equation that results in the curved inlet shape. As noted above, such an equation may be modeled based on various combinations of heights and diameters. One such suitable equation may generally be considered an elliptical shape. In such an embodiment, the radius of curvature (e.g., curvature 364) may increase at from the outer extent of the inlet 316 to the body portion 312. In one exemplary embodiment, the inlet portion 316 is designed such that the jet 252 makes a smooth transition into the insert 310, without unnecessary turbulence, pressure loss, or flow separations.

Although the air admission hole 250 and corresponding insert 310 are generally circular in the depicted exemplary embodiments, the inlets and/or outlets of the air admission holes 250 and inserts 310 may be modified as necessary or desired. For example, the inlets of the air admission holes air admission holes 250 and inserts 310 may be a non-circular shape, including rectangular, racetrack, oval, and square.

Additionally, the air admission holes 250 and inserts 310 may be clocked if additional alignment or interleaving of the jets is desired to produce, for example, an upstream swirl and effusion film.

Figure 4:
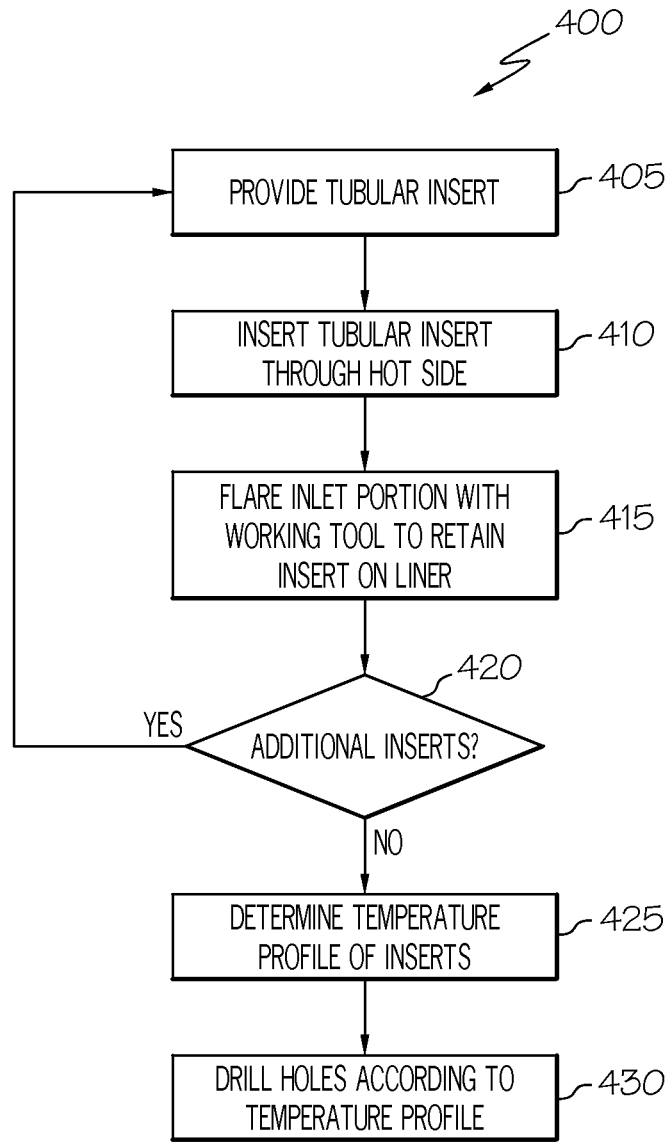
FIG. 4 is a flow chart of a method for installing inserts in a combustor liner in accordance with an exemplary embodiment.

FIG. 4 is a flow chart of a method 400 for installing an insert in a combustor liner, such as insert 310 in outer liner 210, in accordance with an exemplary embodiment, although the method 400 is applicable to inserts in any air admission hole of the inner or outer liner. FIGS. 5-9 depict installation steps of the method 400 and will be referenced in the description of FIG. 4 below.

Figure 5:
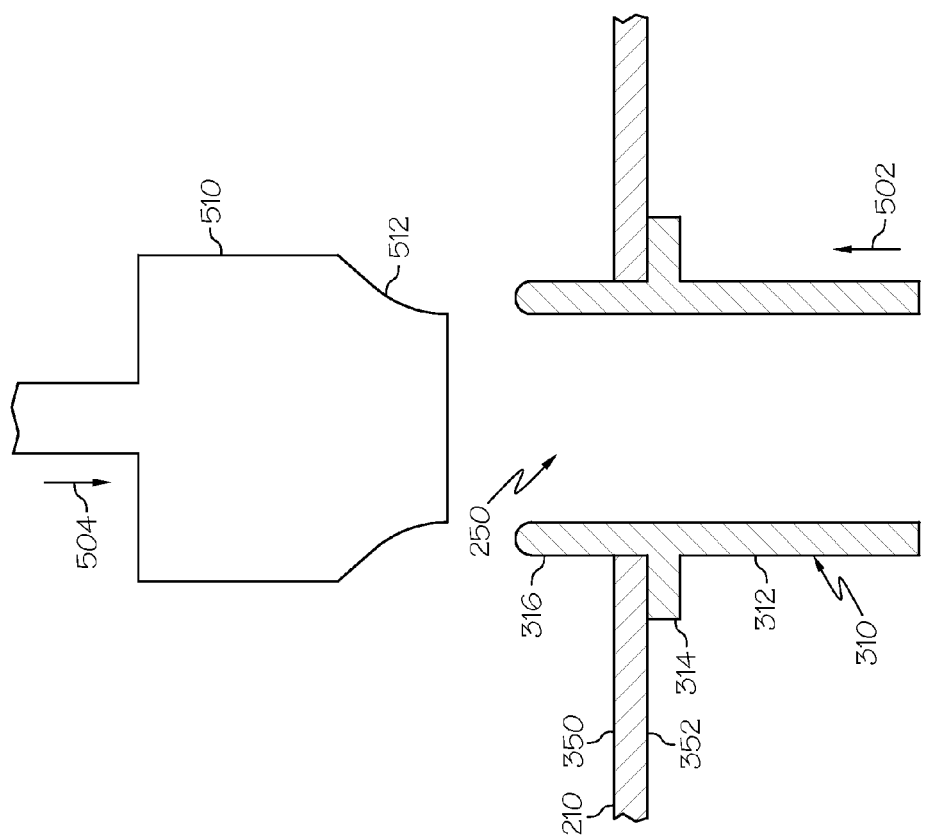
FIG. 5 is an enlarged portion of a combustor illustrating an installation step of the method of FIG. 4 in accordance with an exemplary embodiment.

In a first step 405 of the method 400, an insert 310 is provided. At this stage, the insert 310 is generally configured as depicted in FIG. 5 and includes the tubular body portion 312 and the shoulder 314 circumscribing the body portion 312. As also shown in FIG. 5, the inlet portion 316 in this step generally has a circumference equal to that of the body portion 312. In other words, the body portion 312 and the inlet portion 316 form a single tube shape with a generally constant diameter.

In a second step 410, the inlet portion 316 is inserted through the air admission hole 250 of the outer liner 210 from the hot side 352 (i.e., in the direction 502) until the shoulder 314 abuts the hot side 352. Since the inlet portion 316, at this stage, generally has the same circumference as the body portion 312 and the air admission hole 250, the inlet portion 316 may pass through the air admission hole 250 from the hot side 352 without obstruction until the shoulder 314 abuts the hot side 352.

Figure 6:
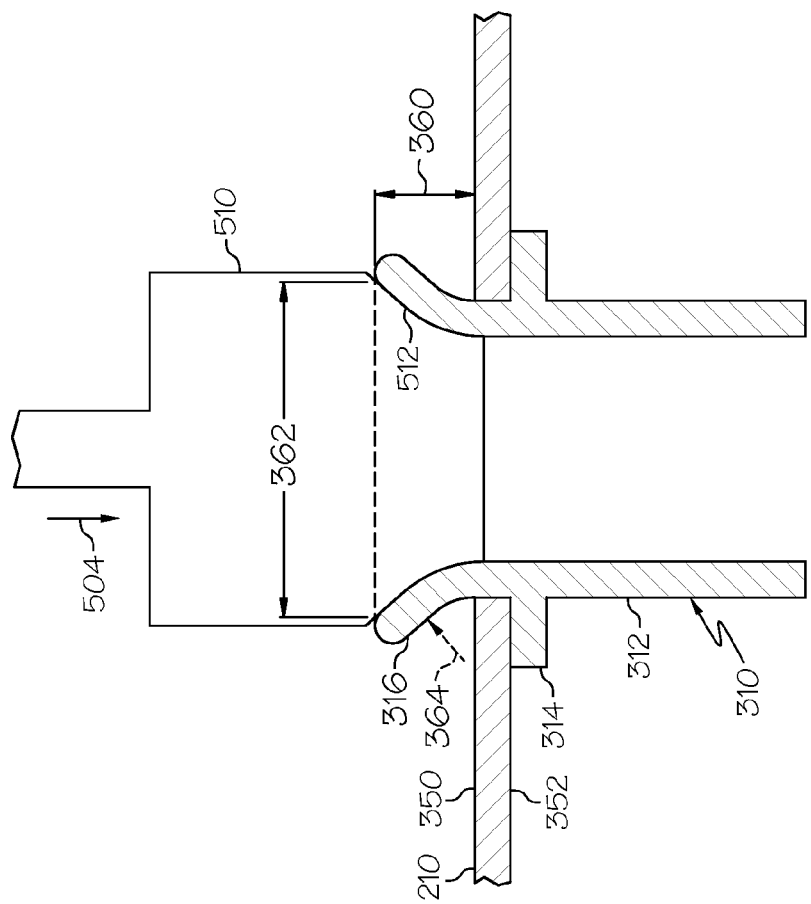
FIG. 6 is an enlarged portion of a combustor illustrating another installation step of the method of FIG. 4 in accordance with an exemplary embodiment.

In a step 415, a working tool 510 is lowered in direction 504 to flare the inlet portion 316, as is particularly shown in FIG. 6. The working tool 510 may be lowered, for example, in a machine press (not shown). The working tool 510 has a contour 512 that matches the final geometry of the inlet portion 316, including the height 360, diameter 362, and curvature 364 of the inlet portion 316. As such, the geometric configuration of the inlet portion 316 may be precisely controlled by the geometry of the working tool 510. Given the contour 512 and controlled precision of the working tool 510, the deformation or flaring of the inlet portion 316 does not require a backing structure at the inlet portion 316 as a counter-force to the deformation. This results in an easier and simpler installation. A counter-press may be provided at the shoulder 314 to maintain the position of the insert 310 relative to the liner 210 as the working tool 510 deforms the inlet portion 316. The working tool 510 is then removed from the insert 310. As also noted above, the flared inlet portion 316 and shoulder 314 function to retain the insert 310 within the air admission hole 250 of the liner 210 without welding to the outer liner and without damage to any coatings on the outer liner 210 or the outer liner 210 itself. This installation method 400 further provides a versatile insert design by accommodating different hole diameters, insert dimensions, and inlet portion profiles. The resulting configuration provides an insert 310 in a single-walled combustor 208 that enables enhanced durability and/or operation. Conventional double-walled combustors typically do not encounter the same insert mounting issues as single-walled combustors since any inserts in a double-walled arrangement may be mounted on a cold wall or trapped between the two walls without consideration for strain isolation. Since single-walled combustors have no cold wall, conventional single-walled combustors typically do not use inserts since welding may yield undesirable thermal behavior. In contrast, exemplary embodiments discussed herein provide the advantages of inserts in single-walled combustors without the corresponding mounting issues. However, aspects discussed herein may also be applied to double-walled combustors.

Although FIGS. 5 and 6 depict forming the flared inlet portion 316 with a single working tool 510, in other embodiments, more than one working tool may be used. For example, a first working tool 510 may partially flare the inlet portion 316 and a second working tool may be used to provide the final shape of the inlet portion 316.

In a step 420, if additional inserts 310 are to be installed, the method 400 returns to step 405 to mount the other inserts 310. Otherwise, the method 400 proceeds to step 425.

Figure 7:
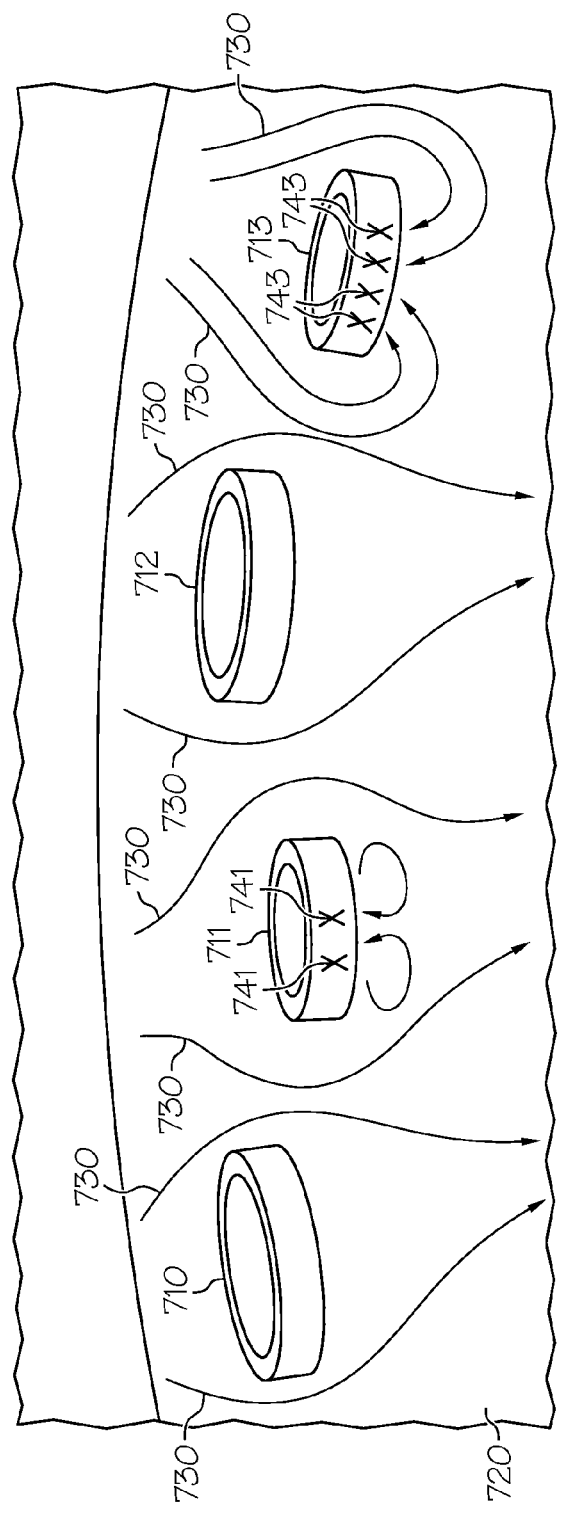
FIG. 7 is an enlarged portion of a combustor illustrating another installation step of the method of FIG. 4 in accordance with an exemplary embodiment.

In a step 425, a temperature profile of the liner 210 and inserts 310 is determined. As an example, FIG. 7 is a perspective view of a number of inserts 710, 711, 712, and 713 similar to the inserts describe above installed on a liner 720. The view of FIG. 7 depicts the hot side of the liner and the results of a Computational Fluid Dynamics (CFD) analysis. Particularly, it is generally desirable for hot combustion gases, represented by streamlines 730, to flow around the inserts 710-713. However, at times, the streamlines 730 may form a vortex or otherwise depart from smoothly flowing past the inserts 710-713. These instabilities may result in elevated temperature on the insert 710-713, particularly at the tip, as hot air is recirculated. As an example, inserts 711 and 713 have recirculating streamlines 730, which if unaddressed, may result in localized elevated temperatures in areas 741 and 743. As described below, cooling holes may be drilled in the inserts 710-713 at these areas 741 and 743 to prevent or mitigate elevated temperatures. Any number of cooling holes may be provided. For example, in the depiction of FIG. 7, one hole may be provided in each area 741 and 743 (e.g., two holes in insert 711 and four holes in insert 713).

Figure 8:
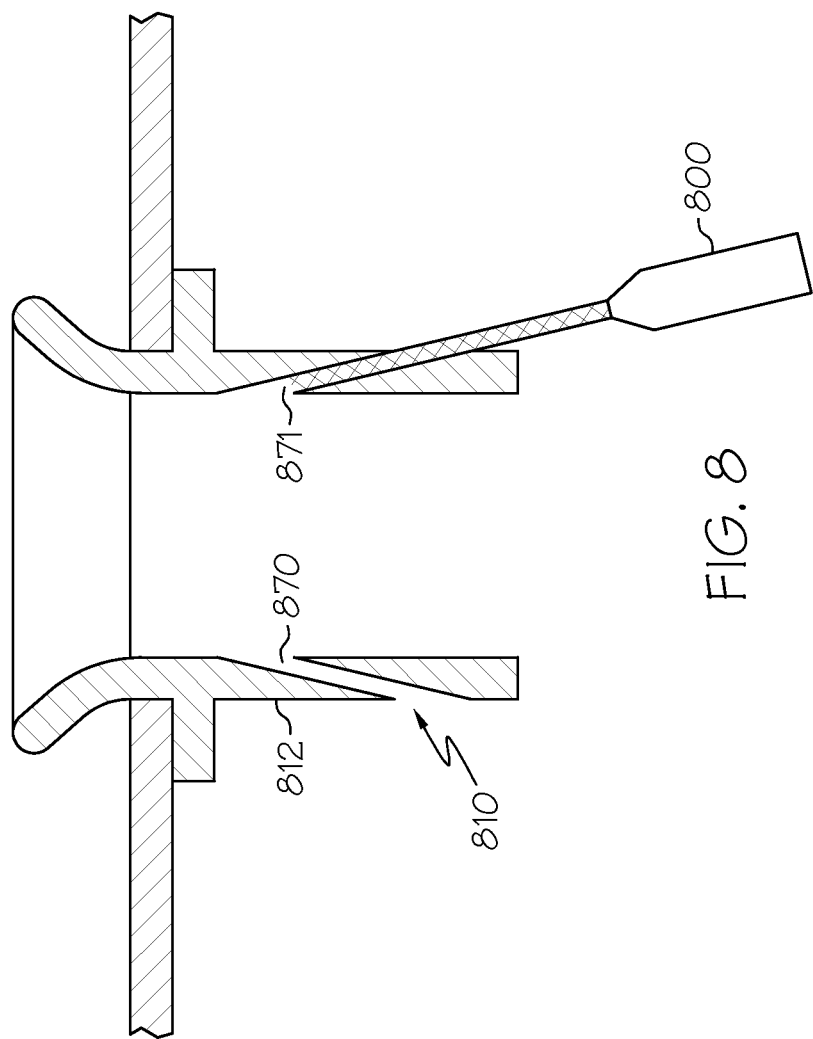
FIG. 8 is an enlarged portion of a combustor illustrating another installation step of the method of FIG. 4 in accordance with an exemplary embodiment.
Figure 9:
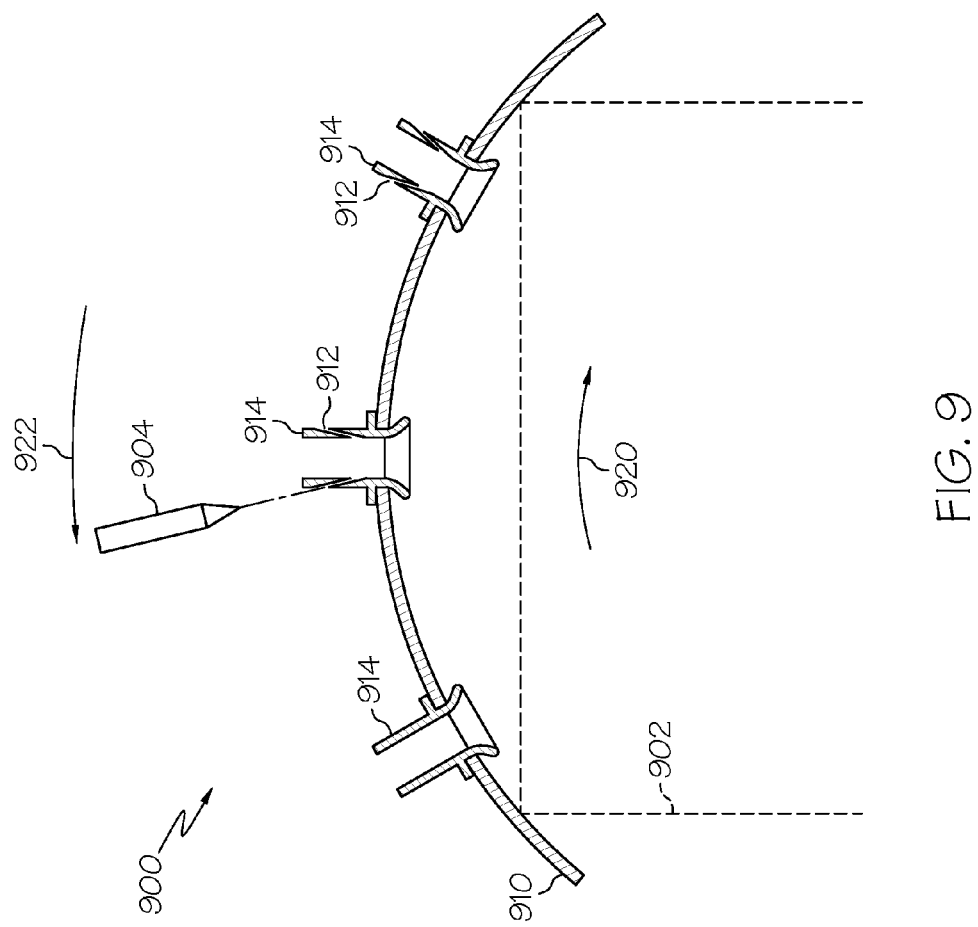
FIG. 9 is a schematic view of a drilling set-up in the method of FIG. 4 in accordance with an exemplary embodiment.

Returning briefly to FIG. 4, in a step 430, cooling holes are drilled according to the temperature profile of step 425. FIG. 8 is a cross-sectional view of an insert 810 similar to the inserts discussed above with a laser 800 drilling cooling holes 870 and 871. In the view of FIG. 8, the laser 800 has drilled cooling hole 870 and is in the process of drilling cooling hole 871. Generally, the liner 802 may be mounted onto a support (not shown in FIG. 8) and the laser 800 or the liner 802 may be positioned and repositioned to drill the cooling holes 870 and 871 at the appropriate locations, angles, and widths (or diameters). The laser drilling may continue, as necessary, for each of the inserts of the liner. As an example, FIG. 9 is a schematic view of a drilling set-up 900 in which a liner 910 is mounted on a support 902 and a drill 904 is positioned relative to the liner 910 to drill cooling holes 912 in inserts 914. As a cooling hole 912 is completed, the liner 910 or drill 904 may be repositioned, as indicated by arrows 920 and 922, to drill subsequent cooling holes 912. As such, cooling holes 912 may be selectively provided in the areas that may be subject to elevated temperatures, thereby maintaining insert temperatures while minimizing cooling air.

The inserts described above generally make reference to the embodiment of the insert 310 shown in FIG. 3. However, alternate embodiments of the insert may be provided. For example, FIGS. 10-13 are cross-sectional views of insert in accordance with additional exemplary embodiments.

Figure 10:
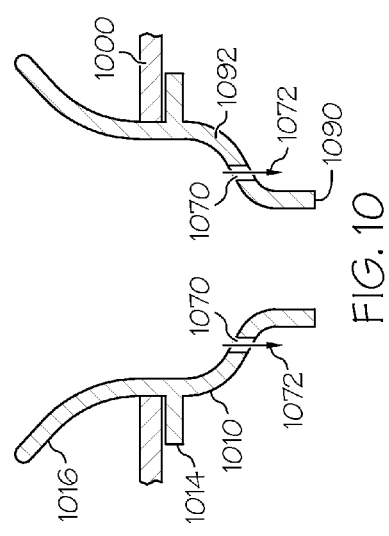

In the embodiment of FIG. 10, the insert 1010 has a flared inlet portion 1016 and shoulder 1014 to retain the insert 1010 relative to the liner 1000. In this embodiment, the tip 1090 has a reduced diameter downstream of a transition portion 1092. As such, the cooling holes 1070 may be provided in the transition portion 1092, generally in a radial direction to provide cooling air 1072 to the tip 1090. Since the orientations of the cooling holes 1070 are parallel to the quench jet, pressure losses may be minimized as air flows through the cooling holes 1070.

Figure 11:
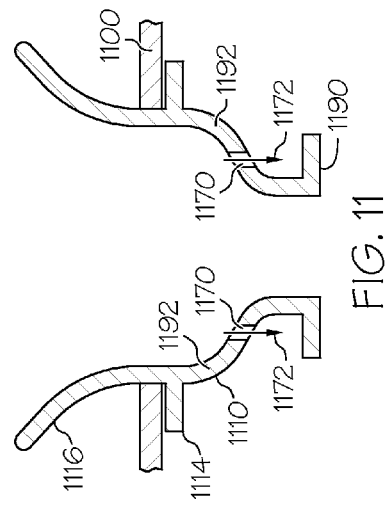
FIGS. 10-13 are cross-sectional views of inserts in accordance with additional exemplary embodiments.

In the embodiment of FIG. 11, the insert 1110 has a flared inlet portion 1116 and shoulder 1114 to retain the insert 1110 relative to the liner 1100. As in the embodiment of FIG. 10, the tip 1190 has a reduced diameter downstream of a transition portion 1192. However, unlike the embodiment of FIG. 10, the tip 1190 further includes an axial flange 1194. The cooling holes 1170 may be provided in the transition portion 1192, generally in a radial direction to provide cooling air 1172 to the tip 1190.

Figure 12:
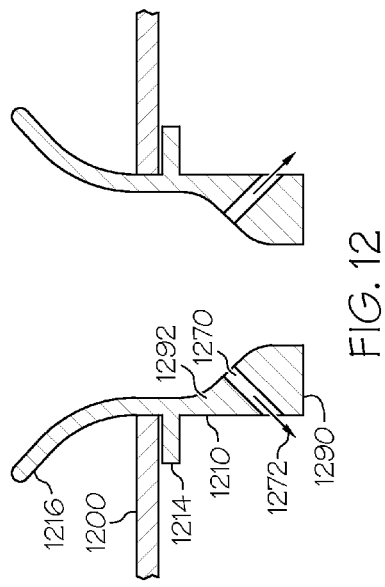

In the embodiment of FIG. 12, the insert 1210 has a flared inlet portion 1216 and shoulder 1214 to retain the insert 1210 relative to the liner 1200. In this embodiment, the insert 1210 has a reduced diameter downstream of a transition portion 1292. Unlike the embodiment of FIG. 10, the insert 1210 has a reduced diameter as a result of a thicker tip 1290. In this embodiment, the cooling holes 1270 may be provided at an angle to deliver cooling air 1272 to the tip 1290.

Figure 13:
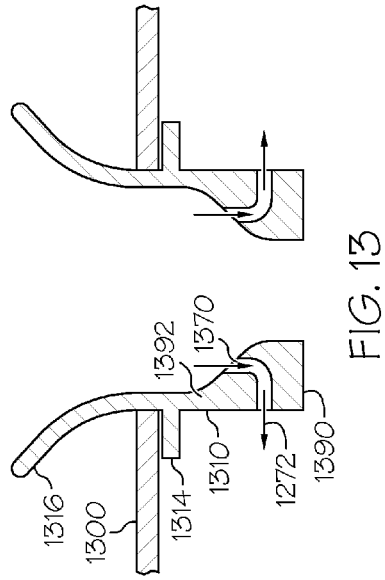

In the embodiment of FIG. 13, the insert 1310 has a flared inlet portion 1316 and shoulder 1314 to retain the insert 1310 relative to the liner 1300. Similar to the embodiment of FIG. 12, the insert 1310 has a reduced diameter downstream of a transition portion 1392 resulting from a thicker tip 1390. In this embodiment, the cooling holes 1370 may have compound directions, e.g., in a radial direction from an interior surface to an axial direction to the exterior surface. In each of the embodiments of FIGS. 11-13, as well as the other embodiments, the cooling air flowing through the cooling holes (e.g., holes 1170, 1270, and 1370) may be angled to initiate an effusion cooling on the inner liner (e.g., liner 1100, 1200, and 1300). In other embodiments, effusion cooling may be omitted.

Accordingly, exemplary embodiments discussed herein provide a combustor with enhanced performance and emission characteristics while maintaining acceptable component temperatures. In particular, cooling holes are provided in the insert to provide cooling air to the tip of the insert in a simple, cost effective manner. Reduced tip temperatures may improve overall combustor durability. Additionally, the cooling holes may be selectively drilled based on a temperature profile of the combustors, thereby minimizing the cooling flow required.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
   a first liner having a first hot side and a first cold side;
   a second liner having a second hot side and a second cold side, the second hot side and the first hot side forming a combustion chamber therebetween, the combustion chamber configured to receive an air-fuel mixture for combustion therein; and
   an insert comprising a body portion extending through the first liner and terminating at a tip, the body portion configured to direct air flow into the combustion chamber,
   the insert further including a cooling hole defined in the body portion and configured to direct a first portion of the air flow toward the tip as cooling air,
   wherein the body portion has an interior surface and an exterior surface, the cooling hole extending from the interior surface to the exterior surface,
   wherein the body portion is generally tubular,
   wherein the first liner is a single-walled liner, and
   wherein the tubular body portion has a longitudinal axis, and wherein the cooling hole extends from the interior surface to the exterior surface at an angle of less than 90° and greater than 0° relative to the longitudinal axis, wherein the cooling hole extends from an inlet on the interior surface to an outlet on the exterior surface, the angle being defined at the outlet relative to the external surface.

2. The combustor of claim 1, wherein the cooling hole is at least partially defined in the exterior surface of the body portion proximate to the tip.

3. The combustor of claim 1, wherein the body portion further comprises a shoulder circumscribing the body portion and abutting the first hot side, and an inlet portion coupled to the body portion and arranged relative to the first cold side such that the inlet portion and the shoulder capture the first liner therebetween to retain the insert.

4. The combustor of claim 1, wherein the combustion chamber defines a rich burn zone, a quench zone, and a lean burn zone, and the insert is configured to introduce air into the quench zone.

5. The combustor of claim 1, wherein the body portion projects into the combustion chamber.

6. The combustor of claim 1, wherein the body portion includes an inlet portion opposite the tip, the inlet portion being flared to guide air into the insert.

7. The combustor of claim 1, wherein the angle is approximately 20° relative to the longitudinal axis.

* * * * *